(12) United States Patent
Liang et al.

(10) Patent No.: US 8,953,643 B2
(45) Date of Patent: Feb. 10, 2015

(54) MEASUREMENT CONFIGURATION METHOD OF MULTI-CARRIER SYSTEM AND EQUIPMENT THEREOF

(76) Inventors: Jing Liang, Beijing (CN); Haitao Li, Beijing (CN)

( * ) Notice: Subject to any disclaimer, the term of this patent is extended or adjusted under 35 U.S.C. 154(b) by 87 days.

(21) Appl. No.: 13/695,430

(22) PCT Filed: Apr. 18, 2011

(86) PCT No.: PCT/CN2011/072955
§ 371 (c)(1),
(2), (4) Date: Jan. 10, 2013

(87) PCT Pub. No.: WO2011/134360
PCT Pub. Date: Nov. 3, 2011

(65) Prior Publication Data
US 2013/0100841 A1   Apr. 25, 2013

(30) Foreign Application Priority Data
Apr. 30, 2010   (CN) .......................... 2010 1 0164663

(51) Int. Cl.
*H04J 1/00*   (2006.01)
*H04W 36/30*   (2009.01)
(Continued)

(52) U.S. Cl.
CPC .......... *H04W 36/30* (2013.01); *H04W 36/0094* (2013.01); *H04L 5/001* (2013.01); *H04L 5/0091* (2013.01)
USPC ........... 370/485; 370/330; 370/329; 370/436; 370/482

(58) Field of Classification Search
USPC ........................ 370/485, 482, 330, 329, 436
See application file for complete search history.

(56) References Cited

U.S. PATENT DOCUMENTS 6,628,630 B1 * 9/2003 Nagase .......................... 370/331
8,054,802 B2 * 11/2011 Burgess et al. ............... 370/331
(Continued)

FOREIGN PATENT DOCUMENTS

CN    101588629    11/2009
CN    101616425    12/2009
(Continued)

OTHER PUBLICATIONS

ISR for corresponding PCT/CN2011/072955 mailed on Jul. 21, 2011, and its English translation.
(Continued)

*Primary Examiner* — Ricky Ngo
*Assistant Examiner* — Dewanda Samuel
(74) *Attorney, Agent, or Firm* — Ladas & Parry, LLP (57) ABSTRACT

The present invention discloses Measurement configuration method of multi-carrier system and equipment thereof, and the method comprises the following steps: the terminal determines whether the frequency of target PCC exists in the measurement configuration after inter-frequency handover or inter-frequency RRC connection re-establishment is completed successfully, exchanges relevant measurement configuration of source PCC with that of target PCC when that of target PCC exists in the determined measurement configuration; and, deletes or reserves relevant measurement configuration of SCC, or exchanges relevant measurement configuration of source SCC with that of target SCC. The present invention solves the problem of measurement exchange and configuration of terminal under CA working condition when RRC connection re-establishment and handover of inter-frequency are completed successfully, saves air interface signaling and reduces the realization complexity.

18 Claims, 6 Drawing Sheets

(51) Int. Cl.
*H04W 36/00* (2009.01)
*H04L 5/00* (2006.01)

(56) References Cited

U.S. PATENT DOCUMENTS

| | | | |
|---|---|---|---|
| 8,331,322 B2 * | 12/2012 | Wu | 370/331 |
| 8,385,832 B2 * | 2/2013 | Johansson et al. | 455/63.1 |
| 8,385,959 B2 * | 2/2013 | Lee et al. | 455/509 |
| 2007/0173256 A1 * | 7/2007 | Laroia et al. | 455/436 |
| 2008/0287068 A1 * | 11/2008 | Etemad | 455/68 |
| 2009/0270109 A1 * | 10/2009 | Wang et al. | 455/453 |
| 2009/0310563 A1 * | 12/2009 | Chou et al. | 370/331 |

FOREIGN PATENT DOCUMENTS

| | | | |
|---|---|---|---|
| CN | 101674586 | 3/2010 | |
| GB | 2479534 * | 4/2010 | H04W 36/08 |

OTHER PUBLICATIONS

IPRP for corresponding PCT/CN2011/072955 issued on Nov. 6, 2012, and its English translation.

* cited by examiner

MEASUREMENT CONFIGURATION METHOD OF MULTI-CARRIER SYSTEM AND EQUIPMENT THEREOF

CROSS-REFERENCE TO RELATED APPLICATIONS

This application is the U.S. National Stage of International Patent Application No. PCT/CN2011/072955 filed on Apr. 18, 2011, which claims priority to Chinese patent application No. 201010164663.9 entitled "Measurement configuration method of multi-carrier system and equipment thereof" filed in the Chinese Patent Office on Apr. 30, 2010, the disclosures of which are hereby incorporated by reference in their entireties.

The application requires the following priority of Chinese patent application:

It is submitted to the Chinese Patent Office on Apr. 30, 2010, the application No. 201010164663.9, invention name as "Measurement configuration method of multi-carrier system and equipment thereof".

FIELD OF THE INVENTION

The present invention relates generally to the field of radio communication, and more particularly to measurement configuration method of multi-carrier system and equipment thereof.

BACKGROUND OF THE INVENTION

LTE-A system introduces Carrier Aggregation (CA), which enables UE (User Equipment) to work on several carriers simultaneously. But in LTE system where UE works on single carrier, if inter-frequency handover or re-establishment occurs to UE, UE needs to switch the measurement configuration of source cell and target cell after handover or re-establishment success.

Therein, the present technologies involved are:
(1) Multi-Carrier System

Figure 1:
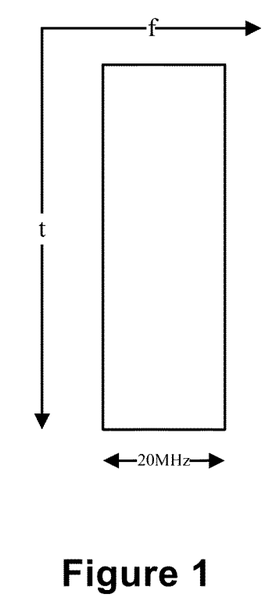
FIG. 1 is a diagram of carrier distribution in LTE cell of prior art.

In LTE and previous radio communication system, there is only one carrier in a cell, and the maximum bandwidth in LTE system refers to 20 MHz, as shown in FIG. 1.

Figure 2:
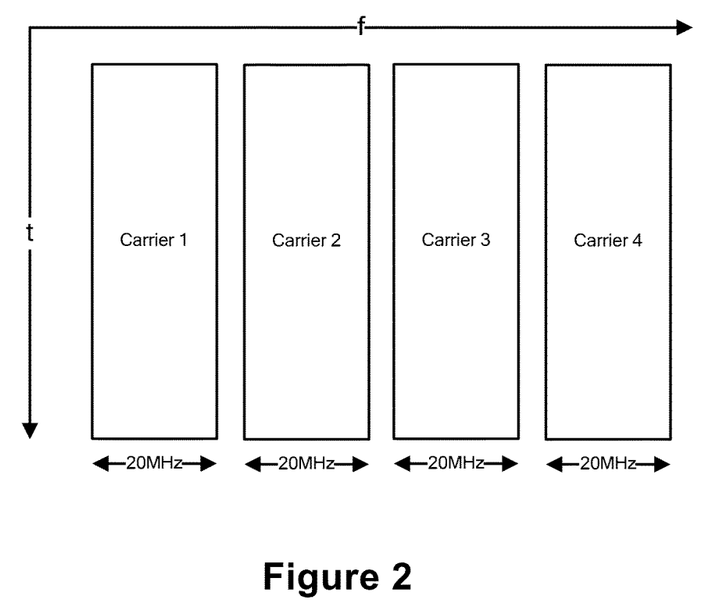
FIG. 2 is a diagram of CA technology of LTE-A in prior art.

In LTE Advanced (LTE-A) system, the peak rate is greatly improved compared with LTE, which is required to be 1 Gbps at downlink and 500 Mbps at uplink. Only using the carrier with maximum bandwidth of 20 MHz can hardly achieve the requirements of peak rate. Therefore, LTE-A system needs to expand the bandwidth available to terminal, thus the introduction of CA (Carrier Aggregation), that is, aggregate several continuous or discontinuous carriers under the same eNB (evolved Node-B,) and serve UE (User Equipment), so as to provide the required rate; thus these aggregated carriers are also called CC (Component Carrier). Each cell can be a cell, and those cells (CCs) under different eNB cannot be aggregated. To ensure UE of LTE can work under each aggregated carrier, each carrier cannot exceed 20 MHz at most. CA technology of LTE-A is shown in FIG. 2, where there are 4 carriers that can be aggregated under the eNB of LTE-A shown, and the eNB can perform data transmission on 4 carriers and UE simultaneously, to improve system throughput.

(2) LTE Measurement Mechanism

In LTE system, eNB sends measurement configuration information to UE through RRC (Radio Resource Control) signaling, and UE measures (intra-frequency, inter-frequency and inter-RAT) in accordance with the contents of measurement configuration information with the measurement results reported to the network.

RRC connection reconfiguration process is adopted by the network in measurement configuration, and the organization structure of measurement configuration information is:

a. Measurement object: Take the frequency as the basic unit, and each measurement object to be configured is considered as an independent frequency with separate measurement object ID.

b. Report configuration: It can be classified into event trigger report and periodicity trigger report according to trigger types, with separate ID possessed by each report configuration. Report configuration of event trigger type will allocate the threshold of a certain event and the time to trigger, while that of periodicity trigger type will allocate the purpose of periodicity trigger (e.g. report CGI).

Currently, there are five intra-frequency/inter-frequency measurement events in LTE system, including:
Event A1: Serving becomes better than threshold;
Event A2: Serving becomes worse than threshold;
Event A3: Neighbor becomes offset better than serving;
Event A4: Neighbor becomes better than threshold;
Event A5: Serving becomes worse than threshold1 and neighbor becomes better than threshold2.

c. Measurement ID: Independent ID can link a measurement object and report configuration simultaneously. In case of reaching the threshold of stating measurement, UE will judge whether to perform the measurement in accordance with the existence of measurement ID.

d. Other parameters may include measurement value configuration, measurement open threshold, speed state parameter and others.

There are three trigger modes for measurement report: event trigger report, periodicity report, event trigger periodicity report, all of which shall be distinguished according to the combination of various parameters in report configuration.

(3) Primary Component Carrier (PCC) and Secondary Component Carrier (SCC)

CA technology has introduced the concepts of Primary Component Carrier (PCC) and Secondary Component Carrier (SCC); UE has only one PCC (uplink and downlink) and others all refer to SCC. For measurement, PCC and SCC generally refer to frequency; serving cell on PCC is called Pcell while that on SCC is called Scell. PCC is characterized by:

1. Uplink PCC is used to transmit uplink control information of physical layer (ACK/NACK, CQI, D-SR, etc.);
2. Downlink PCC cannot be deactivated;
3. When radio link failure occurs to downlink PCC, UE will trigger RRC connection re-establishment process; (this phenomenon will not happen in case of radio link failure to SCC)
4. System information acquisition and update of downlink PCC is the same as LTE process;
5. NAS (Non-Access Stratum) information is acquired through downlink PCC.

Generally, the carrier which initial linked to UE is PCC and the follow-up configured and activated carriers refer to SCC. PCC has bound many features (e.g. uplink control information of physical layer is only transmitted on uplink PCC); therefore UE must possess PCC under CA working condition. All carriers (including PCC and SCC) configured to UE are called configured carrier assembly of UE, and eNB can activate/deactivate the carriers inside configured carrier assembly through MAC CE (MAC Control Element), only the activated carrier can perform data transceiving.

(4) Measurement in LTE-A CA System

Figure 4:
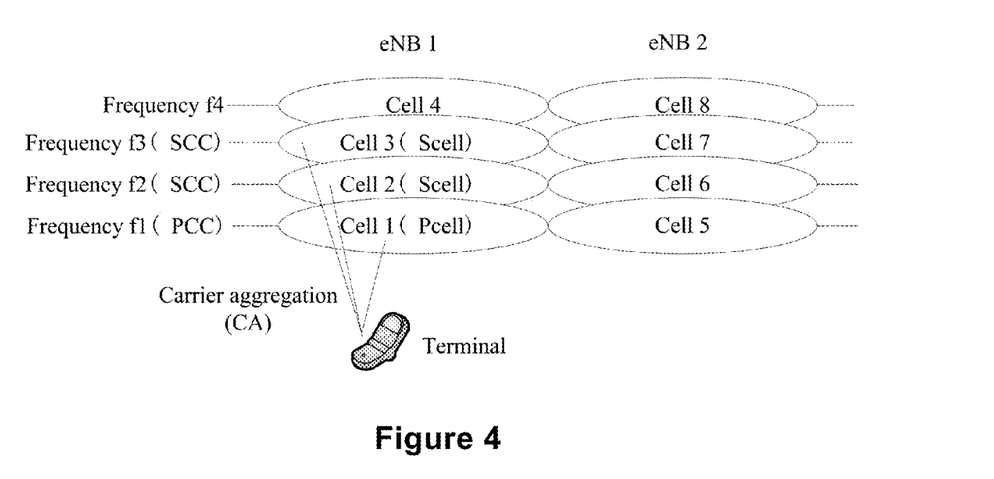
FIG. 4 is a diagram of network scenarios in embodiment I of the present invention.

Currently, there are some basic schemes for measurement of CA system: For each CC configured for UE (including the activated and deactivated), the network is capable of configuring A1 and A2 events for it (as shown in FIG. 4, cell 1 refers to Pcell, and cell 2 refers to Scell; frequency f1 refers to PCC and f2 refers to SCC; the network configures A1 and A2 events for cell 1 and cell 2);

For each CC configured for UE (including the activated and deactivated), the network is capable of configuring intra-frequency A3 event for its frequency; serving cell of the A3 event refers to the CC (Pcell or Scell) configured for UE on that frequency, while neighbor cell can be any other cell there (as shown in FIG. 4, the network configures intra-frequency A3 event measurement for f2 frequency and the serving cell refers to cell 2);

As for each frequency measurable for UE (including those configured to UE or not), the network can configure A3 event with serving cell of Pcell (A3-PCC) for it, that is, serving cell of A3-PCC refers to the current Pcell of UE, while neighbor cell can be any cell on other frequency or PCC (as shown in FIG. 4: for the unconfigured f3, the network configures A3-PCC measurement, serving cell refer to cell 1 and target cell is the cell on f3, including cell 3 and cell 7; for the configured f2, the network is configures A3-PCC measurement, serving cell refers to cell 1 and target cell is the cell on f2, including cell 2).

In course of performing the present invention, the inventor finds out there are at least the defects below in the prior art:

The prior art can only exchange measurement configuration specific to single carrier. For multi-carrier system, there is no solution yet as for how to perform multi-carrier handover of UE after inter-frequency exchange or re-establishment succeeds when UE works under CA state.

SUMMARY OF THE PRESENT INVENTION

The embodiments of the present invention has provided a method and its device for measurement configuration of multi-carrier system, which is used to realize measurement exchange and configuration when RRC connection re-establishment or handover of inter-frequency occurs to the terminal under CA working condition in multi-carrier system.

The embodiments of the present invention provide measurement configuration methods of multi-carrier system, including:

The terminal determines whether the frequency of target primary component carrier (PCC) exists during measurement configuration when inter-frequency handover or inter-frequency RRC connection re-establishment are completed successfully, exchanges relevant measurement configuration of source PCC with that of the frequency of target PCC during determination; and deletes or remains relevant measurement configuration of secondary component carrier (SCC), or exchanges relevant measurement configuration of source SCC with that of the frequency of target SCC.

Terminal unit provided by the embodiments of the present invention includes:

Determination module, which is used for determining whether the frequency of target PCC exists during measurement configuration of said terminal unit when inter-frequency handover or inter-frequency RRC connection re-establishment are completed successfully;

Measuring & configuring module of primary carrier, which is used for exchanging relevant measurement configuration of source PCC with that of the frequency of target PCC when said determination module determines whether the frequency of target PCC exists during measurement configuration;

Measuring & configuring module of secondary carrier, which is used for deleting or retaining relevant measurement configuration of SCC, or exchanging relevant measurement configuration of source SCC with that of target PCC.

Specific to the scene of inter-frequency handover or success in RRC connection re-establishment of inter-RAT, the aforementioned embodiments of the present invention judges whether the frequency of target PCC exists in its measurement configuration through terminal, then exchanges relevant measurement configuration of PCC and that of target PCC during determination, and processes relevant measurement configuration of SCCs except target PCC correspondingly, thus solving the problem of measurement exchange and configuration of terminal under CA working condition when RRC connection re-establishment and handover of inter-frequency are completed successfully, with air interface signaling saved and realization complexity reduced.

DETAILED DESCRIPTION OF THE EMBODIMENTS OF THE PRESENT INVENTION

Aiming at the problem existing in prior art, the embodiments of present invention puts forward a measurement configuration scheme of multi-carrier system, which is applicable to the scenes of RRC connection re-establishment and handover. In the scheme, UE can exchange relevant measurement configuration of source PCC with that of target PCC, delete relevant measurement configuration of source SCC, and reserve other measurement configurations, thus realizing the measurement configuration in multi-carrier system when UE works under CA state.

Overall process for measurement configuration of multi-carrier system provided by the embodiments of the present invention involves: the terminal determines whether the frequency of target PCC exists in measurement configuration when inter-frequency handover or RRC connection re-establishment of inter-frequency are completed successfully, exchanges relevant measurement configuration of source PCC with that of target PCC when the frequency of target PCC exists; deletes or reserves relevant measurement configuration of SCC excepts target PCC, or exchanges relevant measurement configuration of source SCC with that of target SCC.

Figure 3:
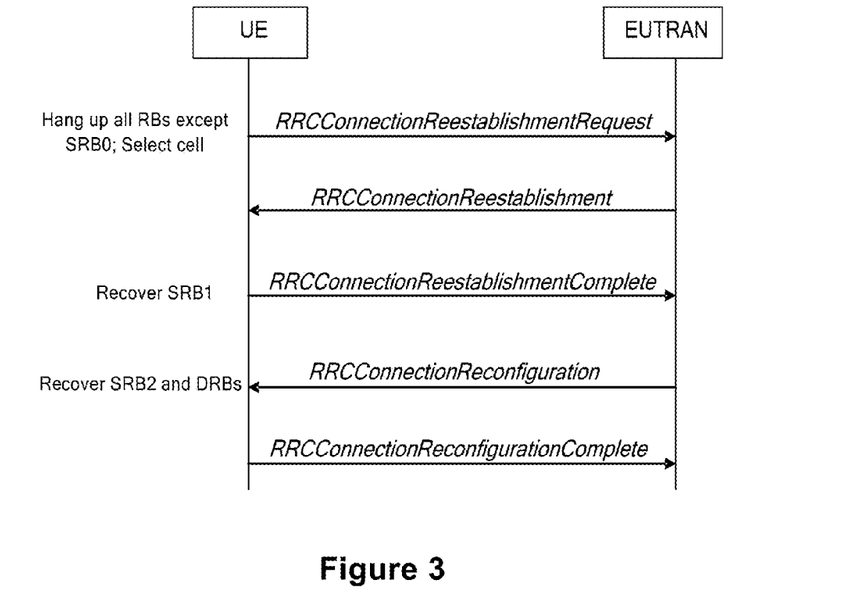
FIG. 3 is a flow diagram of RRC connection re-establishment of LTE system in prior art.

The embodiments of the present invention are applicable to the scenes of RRC connection re-establishment (inter-RAT) and handover (inter-RAT), and the former can be classified into general re-establishment scene, multi-carrier re-establishment scene and fast re-establishment scene in details. Therein:

General re-establishment scene can be shown in FIG. 3;

A kind of multi-carrier re-establishment process is also mentioned in LTE-A with the same process as LTE re-establishment, and the only difference lies in that RRC connection re-establishment process can recover SRB1 (Signaling Radio Bearer 1) on several carriers (instead of only restoring SRB1 on single carrier like LTE). For example, increase configuration information of multi-carrier in RRC connection re-establishment information to make UE recover SRB1 on multi-carrier after receiving the information of RRC connection re-establishment;

Meanwhile, a kind of fast re-establishment process is also mentioned in LTE-A with the same trigger reason as general re-establishment, and the difference lies in selecting cell in UE configuration carrier assembly. If there is no proper cell in configuration carrier assembly, select one cell out of the configuration carrier assembly. Re-establishment will be initiated when proper cell is selected in configuration carrier assembly. In case of re-establishment success, recover SRB2 and DRB (Data Radio Bearer) directly after UE sends the information of RRC connection re-establishment completion to the network. In case of cell selected out of is configuration carrier assembly, the follow-up process will be the same as general re-establishment (may be single carrier or multi-carrier). Fast re-establishment process can recover SRB1 either by single carrier or multi-carrier.

Specific to the aforementioned scenes, the measurement configuration provided by the embodiments of the present invention can involve:

Scheme I, for General Re-Establishment Scene in RRC Connection Re-Establishment Scene (Inter-RAT):

UE can finish RRC connection re-establishment only in one target cell, and UE processes as follows after re-establishment is completed successfully, including:

UE judges whether target frequency after re-establishment (i.e. the frequency of re-establishment cell, also regarded as target PCC) exists in measurement configuration; if any, UE will exchange the corresponding measurement configuration of target re-establishment cell (the frequency of target PCC) with that of source PCC, to be specific, for each relevant measurement ID (such as measurement ID linked with the frequency of source PCC or the frequency of target PCC in measurement ID list): if the measurement object linked to the measurement ID refers to the frequency of target PCC, link the measurement ID to the frequency of source PCC; and if it refers to the frequency of source PCC, link the measurement ID to the frequency of target PCC. If the frequency of target PCC after re-establishment is absent from measurement configuration of UE (viz. not measurement object), UE will delete all measurement IDs linked to the frequency of source PCC;

UE can be further used to process the followings:

Delete relevant measurement ID of SCC (i.e. other SCCs except the frequency of target PCC, the same below);

Delete measurement ID related to periodic measurement directly, stop relevant measurement timer and release measurement gap;

Reserve other measurement configuration information beyond the above operations.

Furthermore, when the first RRC connection re-establishment information after RRC connection re-establishment process carries measurement configuration, UE can reconfigure measurement parameter according the configuration, then measure in accordance with the reconfigured measurement configuration; if it doesn't carry measurement configuration, UE will directly use the measurement configuration after the above operations, then measure accordingly. Of course, special information can also be defined to instruct the terminal to reconfigure measurement parameter, with measurement configuration information to be reconfigured carried.

There is no strict timing requirements for the processing of the above measurement configuration, for example, deletion of measurement ID related to periodic measurement by UE can be conducted before UE judges whether target frequency exists during measurement configuration and processing based on judgment result, or conducted before measurement ID related to the frequency of other SCC excepts the frequency of target PCC is deleted.

Scheme II, for Multi-Carrier Re-Establishment Scene in RRC Connection Re-Establishment Scene (Inter-RAT)

UE initiates RRC connection re-establishment process in one target cell, which can recover SRB1 on several carriers; then UE will process as follows after re-establishment is completed successfully, including:

UE judges whether target frequency of the cell initiating RRC connection re-establishment process (also regarded as the frequency of target PCC) exists in measurement configuration; if any, UE will exchange the corresponding measurement configuration of target PCC of the cell initiating RRC connection re-establishment process with that of source PCC, to be specific, for each relevant measurement ID (such as measurement ID linked with the frequency of source PCC or the frequency of target PCC in measurement ID list): if the measurement object linked to the measurement ID refers to the frequency of target PCC, link the measurement ID to the frequency of source PCC; and if it refers to the frequency of source PCC, link the measurement ID to the frequency of target PCC. If the frequency of target PCC of the cell initiating RRC connection re-establishment process is absent from measurement configuration of UE (viz. not measurement object), UE will delete all measurement IDs linked to the frequency of source PCC.

UE can be further used to process the followings:

Delete measurement ID related to the frequency of other SCCs except the frequency of target PCC;

Reserve other information on measurement configuration except the above operations;

Delete measurement ID related to periodic measurement directly, stop relevant measurement timer and release measurement gap;

Furthermore, when the first RRC connection re-establishment information after RRC connection re-establishment process carries is measurement configuration, UE can reconfigure measurement parameter according the configuration, then measure in accordance with the reconfigured measurement configuration; if it doesn't carry measurement configuration, UE will directly use the measurement configuration after the above operations, then measure accordingly. Of course, special information can also be defined to instruct the terminal to reconfigure measurement parameter, with measurement configuration information to be reconfigured carried.

There is no strict timing requirements for the processing of the above measurement configuration, for example, deletion of measurement ID related to periodic measurement by UE can be conducted before UE judges whether target frequency exists during measurement configuration and processing based on judgment result, or conducted before measurement ID related to the frequency of other SCCs except the frequency of target PCC is deleted.

During the above flows, if eNB reassigns new PCC (not the frequency of the cell initiating RRC connection re-establishment process) in the information of multi-carrier RRC connection re-establishment, the terminal can take the reassigned PCC as target PCC to perform exchange of measurement configuration, i.e. the aforesaid exchange of measurement configuration of this scheme shall be conducted between the source PCC and new PCC assigned by eNB, with specific rules the same as the above exchange process of measurement configuration.

Scheme III, for Fast Re-Establishment Scene in RRC Connection Re-Establishment Scene (Inter-RAT)

UE initiates RRC connection re-establishment process in one target cell, which can recover SRB1, SRB2 and DRBs on several carriers.

If UE selects proper cell in configuration carrier assembly and succeeds in completing RRC connection re-establishment, the exchange of measurement configuration and the processing of other measurement configurations are the same as the corresponding processes of multi-carrier re-establishment scene in Scheme II; if UE selects cell out of configuration carrier assembly and succeeds in completing single-carrier RRC connection re-establishment, the exchange of measurement configuration and the processing of other measurement configurations are the same as the corresponding processes of general re-establishment scene in Scheme I; if UE succeeds in completing multi-carrier RRC connection re-establishment out of configuration carrier assembly, the exchange of measurement configuration and other processes are the same as exchange process of measurement configuration in multi-carrier re-establishment scene of Scheme II.

Another alternative is: for fast re-establishment process, if UE selects cell in configuration carrier assembly and completes RRC connection re-establishment process therein, it means UE only exchanges the measurement configuration of source PCC and that of target PCC with all other measurement configurations reserved (including that of source SCC); if UE selects cell out of configuration carrier assembly and succeeds in completing single-carrier RRC connection re-establishment process, the exchange process of measurement configuration is the same as that in the above general re-establishment scene; if UE successfully completes multi-carrier RRC connection re-establishment process, the exchange process of measurement configuration is the same as that in the above multi-carrier re-establishment scene.

Scheme IV, for Handover Scene (Inter-RAT)

If multi-carrier handover (multi-carrier used by UE before and/or after handover can both be regarded as multi-carrier handover) occurs to UE, and the PCC after handover differs from that before, it will be considered that multi-carrier inter-frequency handover occurs to UE. The measurement configuration process of multi-carrier inter-frequency handover is as follows:

UE judges whether the frequency of target PCC exists in measurement configuration; if it exists, UE will exchange the corresponding measurement configuration of target PCC with that of source PCC, to be specific, for each relevant measurement ID (such as measurement ID linked with the frequency of source PCC or that of target PCC in measurement ID list): if the measurement object linked to the measurement ID refers to the frequency of target PCC, it links the measurement ID to that of source PCC; and if it refers to the frequency of source PCC, it links the measurement ID to that of target PCC. If the frequency of target PCC is absent from measurement configuration of UE (viz. not measurement object), UE will delete all measurement IDs linked to that of source PCC;

Furthermore, UE can also process the following:

Delete measurement ID related to the frequency of other SCCs except that of target PCC;

Reserve other information on measurement configuration except the above operations;

Delete measurement ID related to periodic measurement directly, stop relevant measurement timer and release measurement gap;

Furthermore, when handover command (RRC connection reconfiguration) carries measurement configuration, UE can reconfigure the measurement parameter according the configuration after finishing the above exchange of measurement configuration and other processing, then measure in accordance with the reconfigured measurement configuration; if handover command (information of RRC connection reconfiguration) doesn't carry measurement configuration, UE can directly use the measurement configuration after the above operations, and then measure accordingly.

Furthermore, when general RRC connection reconfiguration process is adopted to perform PCC modification, it requires exchanging measurement configuration according the above rules in this scheme before and after PCC modification. To be specific, if eNB reassigns new PCC in RRC connection reconfiguration, the exchange process of measurement configuration shall be conducted between the source PCC and new PCC assigned by eNB, with specific rules the same as the above exchange process of measurement configuration in this scheme.

Then we will combine the attached drawings in the embodiments of the present invention to clearly and perfectly describe the technical proposals therein. Obviously, the embodiments described below are only a part of them instead of the whole. Based on the embodiments of the present invention, other embodiments acquired by ordinary technicians of this field on the premise of paying no creative work all belong to the protected scope of the embodiments of the present invention.

EMBODIMENT I

For General Inter-Frequency Re-Establishment Scene in Scheme I

Network scenarios of the embodiment are as shown in FIG. 4. UE is working under eNB 1 at present, aggregating cell 1, cell 2 and cell 3, among which the frequency f1 of cell 1 is PCC and cell 1 is referred to as Pcell, while the frequency f2 and f3 of cell 2 and cell 3 are both SCC and the two cells are referred to as Scell. Cell 5, cell 6 and cell 7 are the neighbor cells of f1, f2 and f3 respectively, while cell 4 and cell 8 are the neighbor cells of f4.

Figure 5:
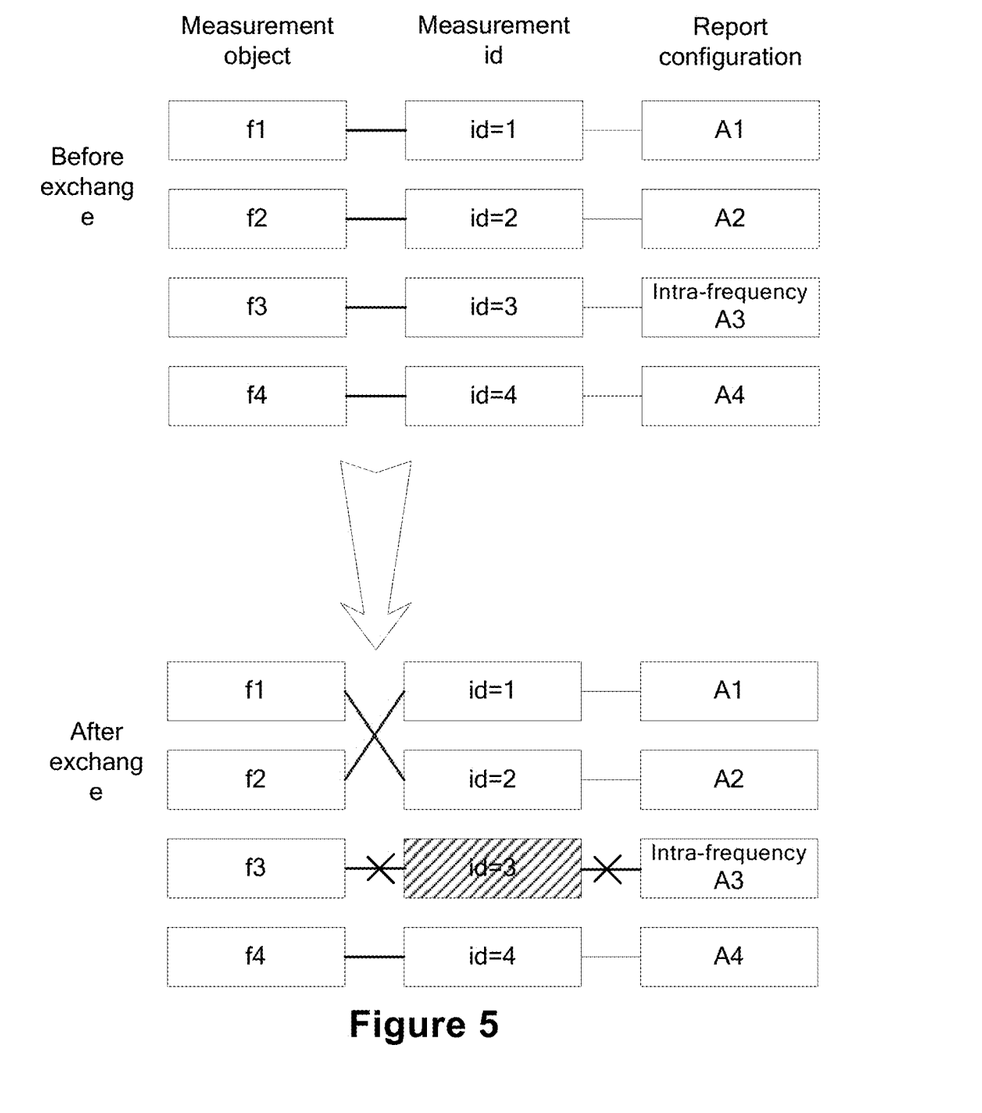
FIG. 5 is a diagram of multi-carrier measurement configuration before and after exchange in embodiment I of the present invention.

The current measurement configuration of UE owns four measurement objects: f1, f2, f3 and f4; and four measurement ids: id=1 links f1 and A1 event, id=2 links f2 and A2 event, id=3 links f3 and A3 event while id=4 links f4 and A4 event, as shown in FIG. 5 "Before Exchange".

When abnormality occurs to UE and RRC connection re-establishment process is triggered, UE will reselect cell to initiate general re-establishment process. In this embodiment, UE's selecting cell 6 to initiate general re-establishment process is taken as an example: UE needs to exchange the measurement configuration corresponding to f1 and f2 after successful re-establishment of cell 6, viz. making id=1 link f2 and A1 event while id=2 link f1 and A2 event. Meanwhile, f3 refers to other SCCs except the frequency of target PCC (f2), so delete relevant measurement id of f3 (i.e. id=3 and associations of the id) according aforementioned processing rules and reserve other measurement configurations, viz. saving measurement object f3 and f4, reporting intra-frequency A3 and A4, and measuring id=4 (and its associations), as shown in FIG. 5 "After Exchange".

Multi-carrier can be configured for UE by the first reconfiguration information after RRC connection re-establishment process, for example, if adding cell 5 and cell 7 to configuration carrier assembly of UE, the configured UE will use CA in cell 5, cell 6 and cell 7. If the connection reconfiguration information carries measurement configuration (e.g. adding id=5 and associating it with f3 and intra-frequency A3 event), UE will reconfigure measurement according the configuration, with details shown in FIG. 6: adding id=5 and linking with f3 and A3 on the basis of the above measurement configuration processing; if the information doesn't carry measurement configuration, UE can directly use the measurement configuration after the above operations, viz. id=1 linking f2 and A1 event, id=2 linking f1 and A2 event, id=4 linking f4 and A4 event (the configuration in FIG. 5 "After Exchange"), then UE shall measure according measurement configuration.

EMBODIMENT II

For Multi-Carrier Inter-Frequency Re-Establishment Scene in Scheme II

Network scenarios and UE configuration of the embodiment are the same as embodiment I, and the difference lies in that: UE adopts multi-carrier inter-frequency scene. Supposing that UE still selects cell 6 to initiate re-establishment, the frequency f2 of the default cell 6 refers to the PCC after re-establishment and cell 5, cell 6 and cell 7 complete multi-carrier re-establishment, then UE only performs measurement configuration exchange on f1 of cell 1 and f2 of cell 6 after completing re-establishment, deletes relevant measurement id (id=3) of f3 and reserves other measurement configurations, with the specific process similar to embodiment I, as shown in FIG. 5.

Figure 6:
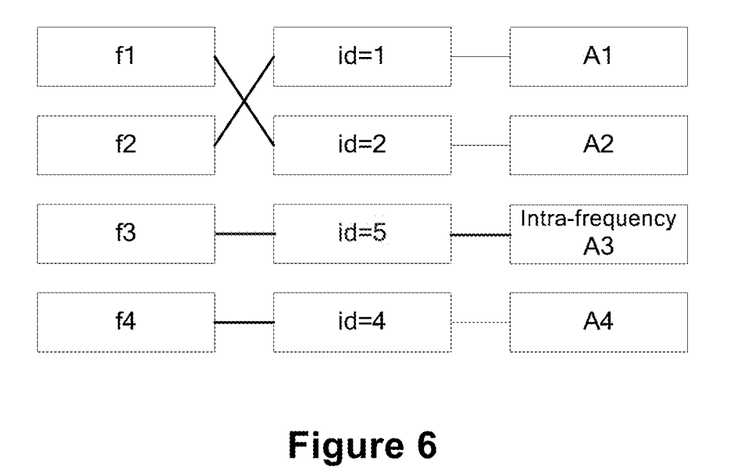
FIG. 6 is a diagram of multi-carrier measurement configuration after reconfiguration in embodiment I of the present invention.

After re-establishment, eNB can send new measurement parameter configuration to UE by sending RRC connection reconfiguration process, just as embodiment I, increasing measurement id=5 and associating with f3 and intra-frequency A3 event; correspondingly, UE can reconfigure the measurement parameter based on the new measurement parameter configuration, just as the follow-up operations of embodiment I, and the reconfigured measurement configuration is shown in FIG. 6; after reconfiguration, UE can measure in accordance with measurement configuration. If eNB doesn't initiate reconfiguration process, UE can measure directly in accordance with the measurement configuration reserved after re-establishment.

If UE initiates multi-carrier re-establishment in cell 6 but eNB has new PCC configured during re-establishment (e.g. frequency f3 of cell 7), UE will exchange the measurement configuration between the new PCC (f3) of eNB configuration and original PCC (f1), delete relevant measurement id (id=2) of f2 and reserve other measurement configurations with specific process similar to embodiment I. If eNB doesn't initiate the aforesaid reconfiguration, UE can finish according similar process of embodiment I without repeated instructions.

EMBODIMENT III

For Fast Inter-Frequency Re-Establishment Scene in Scheme III

Network scenarios and UE configuration of the embodiment are the same as embodiment I. If UE selects inter-frequency cell within configuration carrier assembly to initiate fast re-establishment (such as cell 2 and cell 6 on f2, or cell 3 and cell 7 on f3), the exchange process of measurement configuration is the same as embodiment II; if UE selects inter-frequency cells out of configuration carrier assembly (such as cell 4 or cell 8 on f4), it is the same as embodiment I.

Furthermore, if UE selects inter-frequency cell within configuration carrier assembly to initiate fast re-establishment (such as cell 2 on f2, viz. the PCC after re-establishment) and the multi-carrier after re-establishment remains the current configuration carrier assembly (cell 1 on frequency f1, cell 2 of f2 and cell 3 of f3), there is another method to process relevant measurement configuration of SCC (f3) under the condition of exchanging measurement of the frequency of original PCC frequency (f1) and that of new PCC (f2), viz. saving relevant configurations of SCC (saving measurement id=3 and its associations). Other measurement configuration shall be reserved similarly. If there is follow-up reconfiguration, process in the same way as embodiment I, if there is no, directly measure by using the measurement configuration reserved after re-establishment.

EMBODIMENT IV

For Inter-Frequency Handover Scene in Scheme IV

Network scenarios of the embodiment are the same as embodiment I. Supposing that the current measurement configuration of UE possesses four measurement objects: f1, f2, f3 and f4; and four measurement ids: id=1 links f1 and intra-frequency A3 event, id=2 links f2 and A3-PCC event, id=3 links f3 and A2 event, while id=4 links f4 and A4 event, as shown in FIG. 10 "Before Exchange".

Figure 7:
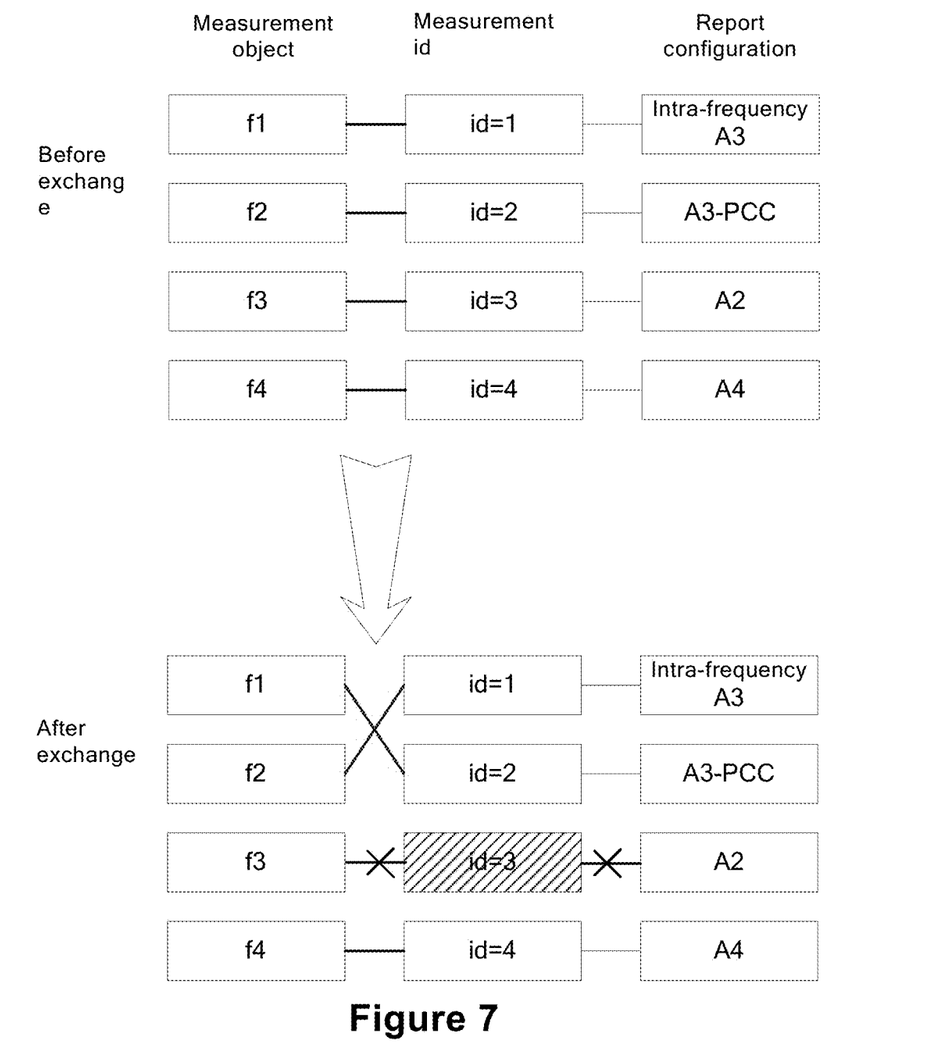
FIG. 7 is a diagram of multi-carrier measurement configuration before and after exchange in embodiment IV of the present invention.

If multi-carrier inter-frequency handover occurs to UE, it handover from cell 1, cell 2 and cell 3 to cell 5, cell 6 and cell 7, among which target PCC (Pcell) refers to f2 (cell 6); after receiving handover command, UE will first exchange the measurement configuration between source PCC (f1) and target PCC (f2) before using the measurement configuration in handover command. UE needs to exchange the measurement configuration corresponding to frequency f1 and f2, viz. linking id=1 to f2 and intra-frequency A3 event, id=2 to f1 and A3-PCC event, delete relevant measurement id of f3 (and associations of the id), viz. id=3, reserve other measurement configurations, viz. measurement object f3 and f4, and report configuration intra-frequency A3 and A4 and measurement id=4 (and its associations), as shown in FIG. 7 "After Exchange".

Figure 8:
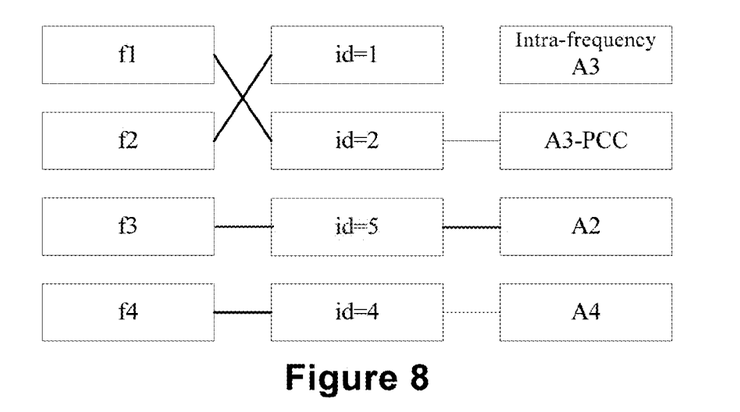
FIG. 8 is a diagram of multi-carrier measurement configuration after reconfiguration in embodiment IV of the present invention.

Furthermore, if eNB instructs UE to reconfigure the measurement through handover command later and the handover command includes measurement configuration (e.g. increasing id=5 and associating it with f3 and A2 event), UE will reconfigure measurement parameter according the configuration after completing the above operations (as shown in FIG. 8); if handover command doesn't carry measurement configuration, UE can use the measurement configuration after the above operations directly, viz. id=1 linking f2 and intra-frequency A3 event, id=2 linking f1 and A3-PCC event, id=4 linking f4 and A4 event (the configuration in FIG. 7 "After Exchange"). Then UE will measure according measurement configuration.

During the handover, there is another scheme of SCC configuration exchange apart from the aforementioned schemes for SCC configuration deletion, that is, exchange the measurement configuration of source SCC with that of target SCC, instead of deletion. It will not be described for the exchange of SCC measurement configuration is similar to PCC.

For the number of SCC is not always the same before and after handover, which causes certain complexity to handover, the embodiments of the present invention prefer to the following rules for processing:

Rule I: If the number of SCC is the same before and after handover, it can be exchanged in accordance with frequency sequence of source SCC (e.g. carrier No. from high to low or from low to high, frequency from high to low or from low to high, or the sequence assigned by dedicated signaling) and SCC sequence appeared in handover command (according to list sequence or carrier No. sequence or other assigned sequences);

Rule II: If the number of SCC before handover is greater than that after handover, exchange of measurement configuration can only be performed between the SCC after handover and the same number of SCC with prior sequence before handover (the sequencing method is the same as rule I);

Rule III: If the number of SCC before handover is smaller than that after handover, exchange of measurement configuration can only be performed between the SCC with prior sequence after handover (the sequencing method is the same as rule I) with the same number of SCC before handover.

EMBODIMENT V

For PCC Modification Scene

Network scenarios of the embodiment are the same as embodiment IV. Supposing that the network changes the PCC of UE from f1 to f2 (e.g. from cell 1 to cell 2) through general reconfiguration process, the exchange of measurement configuration shall be the same as embodiment IV.

Based on the same technical consideration, the embodiments of the present invention also provide a terminal device.

Figure 9:
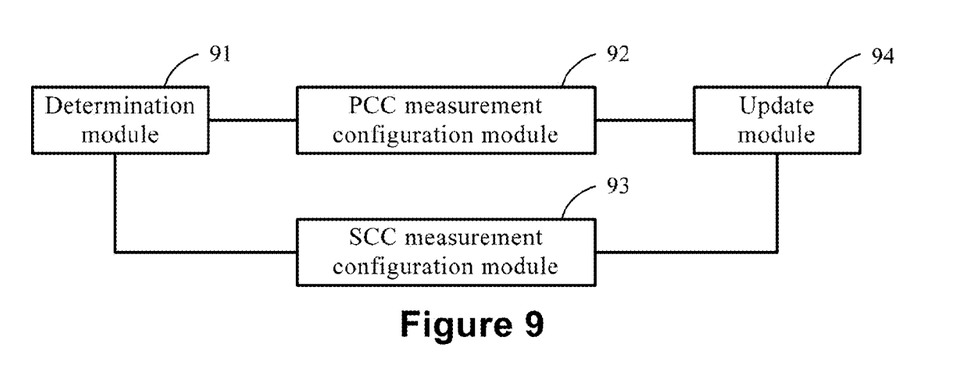
FIG. 9 is a structure diagram of the terminal equipment provided by the embodiments of the present invention.

As shown in FIG. 9, the terminal device includes: determination module 91, PCC measurement configuration module 92 and SCC measurement configuration module 93. Therein:

Determining module 91 is used to determine whether the frequency of target PCC exists in measurement configuration of said terminal device when inter-frequency handover or inter-frequency RRC connection re-establishment is completed successfully;

PCC measurement configuration module 92 is used to exchange relevant measurement configuration of source PCC with that of target PCC when the frequency of target PCC exists in the measurement configuration determined by determination module 91; to be specific, the module can link the measurement ID linked with the frequency of target PCC to that of source PCC, and link the measurement ID linked with the frequency of source PCC to that of target PCC;

SCC measurement configuration module 93 is used to delete or reserve relevant measurement configuration of SCCs except target PCC, or exchange relevant measurement configuration of source SCC with that of target SCC.

In the above terminal device, PCC measurement configuration module 91 can also be applied to delete all measurement IDs linked with the frequency of source PCC, and the linkage of the measurement ID with the frequency of source PCC when the frequency of target PCC is absent from the measurement configuration determined by determination module 91.

The above terminal device can also include update module 94 which is used to update the measurement configuration after exchange and that obtained after processing relevant measurement configuration specific to the frequency of said SCC in accordance with the measurement configuration information in RRC connection reconfiguration information sent by network side after inter-frequency RRC connection re-establishment; or, during inter-frequency handover, perform the same action according the measurement configuration information in handover command sent by network side.

If inter-frequency RRC connection re-establishment refers to multi-carrier re-establishment, PCC measurement configuration module 92 can also be applied to exchange relevant measurement configuration of source PCC with that of the frequency of specified PCC during multi-carrier re-establishment when the multi-carrier RRC connection re-establishment information received by the terminal carries PCC information assigned by network side and the frequency of the PCC is different from that of the cell initiating RRC connection re-establishment.

In the above terminal device, SCC measurement configuration module 93 can be fast re-establishment in inter-frequency RRC connection re-establishment, and the terminal selects the target cell within configuration carrier assembly and completes RRC connection re-establishment therein, then the terminal reserves the measurement configuration relating to the frequency of SCC.

In the above terminal device, SCC measurement configuration module 93 can link the measurement ID linked with the frequency of target SCC to that of source SCC during inter-frequency handover, and link the measurement ID linked with the frequency of source SCC to that of target SCC.

In the above terminal device, SCC measurement configuration module 93 can also be applicable to the following circumstances: if the number of is source SCC equals to that of target SCC, exchange the measurement configurations relating to the frequency of corresponding source SCC and target SCC according to set sequence of that of source SCC and the SCC sequence appeared in handover command; or, if the number of source SCC differs from that of target SCC, only exchange the measurement configuration of SCC with the same number as target SCC and source SCC according to set sequence.

In the above terminal device, PCC measurement configuration module 92 can be further used to reserve other settings in original measurement configuration of said terminal after exchanging relevant measurement configuration of said PCC; or, SCC measurement configuration module 93 can be further used to reserve other configuration information in original measurement configuration of said terminal after processing relevant measurement configuration of said SCC.

In conclusion, the present invention puts forward a method for measurement configuration of multi-carrier system, which solves the problem of measurement exchange and configuration of UE under CA working condition when RRC connection re-establishment and handover of inter-frequency are completed successfully, saves air interface signaling and reduces the realization complexity.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to perform the methods described in all embodiments of the present invention.

Technical personnel of the field can understand that the drawings only refer to the diagram of a preferred embodiment, and the module or procedure is not necessary for the performing of the embodiments of the present invention.

Technical personnel of the field can understand that the module of the unit of an embodiment can be distributed in such unit according to embodiment description, or located in one or more units of another embodiment through corresponding changes. Modules of the embodiments mentioned above can be merged into one module, or further divided into multi-sub modules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not necessary for the implementation of the embodiments of the present invention.

Technical personnel of the field can understand that the module of the unit of an embodiment can be distributed in such unit according to embodiment description, or located in one or more units of another embodiment through corresponding changes. Modules of the embodiments mentioned above can be merged into one module, or further divided into multi-sub modules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method for measurement configuration of multi-carrier system, which comprises:
   a terminal determines whether the frequency of target primary component carrier (PCC) exists in measurement configuration when inter-frequency handover or inter-frequency RRC connection re-establishment are completed successfully;
   if it exists, exchanges relevant measurement configuration of source PCC with that of target PCC, and deletes or remains relevant measurement configuration of secondary component carrier (SCC), or exchanges relevant measurement configuration of source SCC with that of target SCC; and
   if it does not exist, the terminal will delete all measurement IDs linked with source PCC and the linkage of the measurement ID with the source PCC and report configuration ID.

2. The method as claimed in claim 1, wherein, exchanging relevant measurement configuration of source PCC with that of target PCC, specifically:
   Link the measurement ID linked with target PCC to source PCC, and link the measurement ID linked with source PCC to target PCC.

3. The method as claimed in claim 1, wherein, deleting relevant measurement configuration of SCC, specifically:
   Deleting the measurement ID linked with said SCC and the linkage of the measurement ID with said SCC and report configuration ID.

4. The method as claimed in claim 1, wherein, after inter-frequency RRC connection re-establishment, further comprising: said terminal updates the measurement configuration after exchange and that obtained after processing relevant measurement configuration specific to said SCC in accordance with the measurement configuration information in RRC connection reconfiguration information sent by network side;
   Or, during inter-frequency handover, further comprising: said terminal updates the measurement configuration after exchange and that obtained after processing relevant measurement configuration specific to said SCC in accordance with the measurement configuration information in handover command sent by network side.

5. The method as claimed in claim 1, wherein, said inter-frequency RRC connection re-establishment including multi-carrier re-establishment;
   During multi-carrier re-establishment, when the information of multi-carrier RRC connection re-establishment received by terminal carries the PCC information specified by network side, and the PCC differs from that of the cell initiating RRC connection re-establishment, further comprising: the terminal exchanging relevant measurement configuration of source PCC with that of the specified PCC.

6. The method as claimed in claim 5, wherein, exchanging relevant measurement configuration of source PCC with that of the specified PCC, comprising:
   Linking the measurement ID linked with the specified PCC to the source PCC, and linking the measurement ID linked with the source PCC to the specified PCC.

7. The method as claimed in claim 1, wherein, said inter-frequency RRC connection re-establishment refers to fast re-establishment, and the terminal selects the target cell within configuration carrier assembly and completes RRC connection re-establishment therein, then the terminal reserves the measurement configuration relating to SCC.

8. The method as claimed in claim 1, wherein, exchange relevant measurement configuration of source SCC with that of target SCC, specifically:

During inter-frequency handover, said terminal linking the measurement ID linked with target SCC to source SCC, and linking the measurement ID linked with source SCC to target SCC.

9. The method as claimed in claim 1, wherein, exchange relevant measurement configuration of source SCC with that of target SCC, specifically:
If the number of source SCC equals to that of target SCC, exchange the measurement configurations relating to the frequencies of corresponding source SCC and target SCC according to set sequence of source SCC or the SCC sequence appeared in handover command;
If the number of source SCC differs from target SCC, only exchange the measurement configuration of SCC with the same number as target SCC and source SCC according to set sequence.

10. The method as claimed in claim 1, wherein, after exchanging relevant measurement configuration of said PCC and processing that of said SCC, further comprising: saving other configuration information in original measurement configuration of said terminal.

11. A terminal device, which comprises:
Determination module, which is used for determining whether the frequency of target PCC exists during measurement configuration of said terminal device when inter-frequency handover or inter-frequency RRC connection re-establishment are completed successfully;
Measuring and configuring module of primary carrier, which is used for exchanging relevant measurement configuration of source PCC with that of target PCC when said determination module determines when the frequency of target PCC exists during measurement configuration;
Measuring and configuring module of secondary carrier, which is used for deleting or retaining relevant measurement configuration of SCC, or exchanging relevant measurement configuration of source SCC with that of target SCC;
wherein, said PCC measurement configuration module is also applicable to delete all measurement IDs linked with the frequency of source PCC, and the linkage of the measurement ID with the frequency of source PCC when the frequency of target PCC is absent from the measurement configuration determined b said determination module.

12. The terminal device as claimed in claim 11, wherein, said PCC measurement configuration module is applicable to link the measurement ID linked with target PCC to that of source PCC, and link the measurement ID linked with source PCC to that of target PCC.

13. The terminal device as claimed in claim 11, wherein, further comprising:
Update module, which is used to update the measurement configuration after exchange and that obtained after processing relevant measurement configuration specific to the frequency of said SCC in accordance with the measurement configuration information in RRC connection reconfiguration information sent by network side after inter-frequency RRC connection re-establishment; or, during inter-frequency handover, update the measurement configuration after exchange and that obtained after processing relevant measurement configuration specific to the frequency of said SCC in accordance with the measurement configuration information in handover command sent by network side.

14. The terminal device as claimed in claim 11, wherein, said inter-frequency RRC connection re-establishment including multi-carrier re-establishment;
Said PCC measurement configuration module is also applied to exchange relevant measurement configuration of source PCC with that of the specified PCC during multi-carrier re-establishment when the multi-carrier RRC connection re-establishment information received by the terminal carries PCC information assigned by network side and the frequency of the PCC is different from that of the cell initiating RRC connection re-establishment.

15. The terminal device as claimed in claim 11, wherein, said SCC measurement configuration module is applicable to the condition that when inter-frequency RRC connection re-establishment refers to fast re-establishment, and the terminal selects the target cell within configuration carrier assembly and completes RRC connection re-establishment therein, the terminal reserves the measurement configuration relating to the frequency of SCC.

16. The terminal device as claimed in claim 11, wherein, said SCC measurement configuration module is applied to link the measurement ID linked with the frequency of target SCC to that of source SCC, and link the measurement ID linked with the frequency of source SCC to that of target SCC.

17. The terminal device as claimed in claim 11, wherein, said SCC measurement configuration module is applicable to the following circumstances: if the number of source SCC equals to that of target SCC, exchange the measurement configurations relating to the frequency of corresponding source SCC and target SCC according to set sequence of the frequency of source SCC or the SCC sequence appeared in handover command; or, if the number of source SCC differs from that of target SCC, only exchange the measurement configuration of SCC with the same number as target SCC and source SCC according to set sequence.

18. The terminal device as claimed in claim 11, wherein, said PCC measurement configuration module is further applied to reserve other configuration information in original measurement configuration of said terminal after exchanging relevant measurement configuration of said PCC;
Or, said SCC measurement configuration module is further applied to reserve other configuration information in original measurement configuration of said terminal after exchanging relevant measurement configuration of said SCC.

* * * * *